US008295543B2

(12) United States Patent
Tu et al.

(10) Patent No.: US 8,295,543 B2
(45) Date of Patent: Oct. 23, 2012

(54) DEVICE AND METHOD FOR DETECTING TARGETS IN IMAGES BASED ON USER-DEFINED CLASSIFIERS

(75) Inventors: Peter H. Tu, Niskayuna, NY (US); Nils O. Krahnstoever, Schenectady, NY (US); Jens Rittscher, Ballston Lake, NY (US); Gianfranco Doretto, Albany, NY (US)

(73) Assignee: Lockheed Martin Corporation, Gaithersburg, MD (US)

( * ) Notice: Subject to any disclaimer, the term of this patent is extended or adjusted under 35 U.S.C. 154(b) by 1244 days.

(21) Appl. No.: 12/078,300

(22) Filed: Mar. 28, 2008

(65) Prior Publication Data

US 2011/0051999 A1 Mar. 3, 2011

Related U.S. Application Data

(60) Provisional application No. 60/935,821, filed on Aug. 31, 2007.

(51) Int. Cl.
 *G06K 9/00* (2006.01)
 *G06K 9/62* (2006.01)
 *G06K 9/46* (2006.01)

(52) U.S. Cl. ......... 382/103; 382/159; 382/190; 382/224

(58) Field of Classification Search .................. 382/100, 382/103, 159, 190, 224, 226–227; 706/16, 706/18, 20; 707/705; 700/47–48; 235/494–495, 235/487; 348/169
See application file for complete search history.

(56) References Cited

U.S. PATENT DOCUMENTS

| | | | |
|---|---|---|---|
| 6,741,744 B1* | 5/2004 | Hsu | 382/229 |
| 7,899,253 B2* | 3/2011 | Porikli et al. | 382/190 |
| 2004/0056105 A1* | 3/2004 | Silverbrook et al. | 235/494 |
| 2007/0053513 A1* | 3/2007 | Hoffberg | 380/201 |
| 2007/0276776 A1* | 11/2007 | Sagher et al. | 706/25 |
| 2008/0063285 A1* | 3/2008 | Porikli et al. | 382/190 |

OTHER PUBLICATIONS

David Cristinacce, Tim Cootes, Facial feature detection using AdaBoost with shape constraints, University of Manchester, U.K., IEEE International conference on Systems, Man and Cybernetics, Waikoloa, Hawaii Oct. 10-12, 2005, pp. 1692-1698, 2005.*
I. J. Cox and S. L. Hingorani. An efficient implementation and evaluation of Reid's multiple hypothesis tracking algorithm for visual tracking. In *Intl. Conference on Pattern Recognition*, 1994.
N. Dalai and B. Triggs. Histograms of oriented gradients for human detection. In *Proc. Intl. Conference on Computer Vision and Pattern Recognition*, 2005.

(Continued)

*Primary Examiner* — Matthew Bella
*Assistant Examiner* — Mehdi Rashidian
(74) *Attorney, Agent, or Firm* — Oliff & Berridge, PLC

(57) ABSTRACT

A device and method for detecting targets of interest in an image, such as people or objects of a certain type. Targets are detected based on an optimized strong classifier descriptor that can be based on a combination of weak classifier descriptors. The weak classifier descriptors can include a user-defined weak classifier descriptor that is defined by a user to represent a shape or appearance attribute that is characteristic of parts of the target of interest. The strong classifier descriptor can be optimized by selecting a subset of weak classifier descriptors that exhibit improved performance in detecting targets in training images.

17 Claims, 6 Drawing Sheets

OTHER PUBLICATIONS

M. Isard and J. MacCormick. BraMBLe: A Bayesian multiple-blob tracker. In *IEEE Proc. Intl. Conf. Computer Vision*, vol. 2, pp. 34-41, 2001.

N. Krahnstoever and P. Mendonca. Bayesian autocalibration for surveillance. In *Proc. of IEEE International Conference on Computer Vision (ICCV'05)*, Beijing, China, Oct. 2005.

N. Krahnstoever and P. Mendonca. Autocalibration from tracks of walking people. In *Proc. British Machine Vision Conference (BMVC)*, Edinburgh, UK, Sep. 4-7, 2006.

N. Krahnstoever, P. Tu, T. Sebastian, A. Perera, and R. Collins. Multi-view detection and tracking of travelers and luggage in mass transit environments. In *Proc. Ninth IEEE International Workshop on Performance Evaluation of Tracking and Surveillance (PETS)*, New York, 2006.

B. Leibe, E. Seemann, and B. Schiele. Pedestrian detection in crowded scenes. In *Proc. IEEE Conference on Computer Vision and Pattern Recognition*, San Diego, CA, 2005.

K. Mikolajczyk, C. Schmid, and A. Zisserman. Human detection based on a probabilistic assembly of robust part detectors. In *European Conference on Computer Vision*, vol. 1, pp. 69-82. Springer, 2004.

M. Oren, C. Papageorgiou, P. Sinha, E. Osuna, and T. Poggio. Pedestrian detection using wavelet templates. In *Proc. IEEE Conference on Computer Vision and Pattern Recognition*, pp. 193-199, 1997.

C. Rasmussen and G. Hager. Joint probabilistic techniques for tracking multi-part objects. In *Proc. IEEE Conference on Computer Vision and Pattern Recognition*, pp. 16-21, 1998.

J. Rittscher, P.H. Tu, and N. Krahnstoever. Simultaneous estimation of segmentation and shape. In *IEEE Computer Vision and Pattern Recognition*, San Diego, California, vol. 2, pp. 486-493, Jun. 2005.

J. Shotton, A. Blake, and R. Cipolla, Contour-based learning for object recognition. In *Proc. IEEE International Conference on Computer Vision*, pp. 503-510, 2005.

P. Viola and M. Jones, Robust real-time face detection. In *International Conference on Computer Vision*, vol. 2, pp. 747, Vancouver, Canada, 2001.

B. Wu and R. Nevatia. Tracking of multiple, partially occluded humans based on static body part detection. In *Proc. IEEE Conference on Computer Vision and Pattern Recognition*, pp. 951-958, 2006.

T. Zhao and R. R. Nevatia. Bayesian human segmentation in crowded situations. In *IEEE Computer Vision and Pattern Recognition*, Madison, Wisconsin, vol. 2, pp. 459-466, 2003.

\* cited by examiner

DEVICE AND METHOD FOR DETECTING TARGETS IN IMAGES BASED ON USER-DEFINED CLASSIFIERS

CROSS-REFERENCE TO RELATED APPLICATION

The present application claims priority to U.S. Provisional Patent Application No. 60/935,821, which was filed on Aug. 31, 2007, the disclosure of which is incorporated herein by reference in its entirety.

BACKGROUND

The present disclosure relates generally to devices and methods for detecting targets of interest in images, such as people and objects, and for tracking detected targets.

A number of applications require the ability to detect people or objects in images. The ability to detect people or objects of a certain type can be useful in security, forensic, military applications, as well as for tracking people or objects in crowded environments such as mass transit and airports. For example, in many surveillance applications, individuals or objects need to be tracked over a surveillance network encompassing different camera views.

SUMMARY

Many visual systems for tracking targets in images separate the tracking process into track initialization followed by repeated track updates that involve a local search in a prediction gate of the tracks. Other tracking systems separate the tracking process into three steps including target detection, data association and track state update. In the latter approach, tracks only utilize the data that are associated with them to update their internal state. To make this approach feasible, a robust approach to target detection is needed.

Aspects of this disclosure can provide a device and method enabling fast and robust target detection for detecting predetermined targets such as people or objects of a certain class.

According to one aspect of the present disclosure, there is provided a target detection device for detecting predetermined targets that are captured within an image, where the device includes a target region identification device and a classification device. The target region identification device can be configured to identify a region of interest in the captured image, where the region of interest includes a target with geometries that are consistent with the predetermined targets. The classification device can be configured to determine whether the region of interest includes the predetermined targets by analyzing the region of interest with a strong classifier descriptor that describes at least one of shape attributes and appearance attributes that are characteristic of the predetermined targets. The strong classifier descriptor can be based on a subset of weak classifier descriptors that is selected from a plurality of weak classifier descriptors that each describe at least one of shape attributes and appearance attributes that are characteristic of parts of the predetermined targets, and where the subset of weak classifier descriptors includes at least one user-defined weak classifier descriptor that is defined by a user based on database images including the predetermined targets.

In another aspect, there is provided a method for detecting predetermined targets that are captured within an image, where the method includes identifying a target region of interest in the captured image, where the target region of interest includes a target with geometries consistent with the predetermined targets, and determining whether the region of interest includes the predetermined targets by analyzing the region of interest with a strong classifier descriptor that describes at least one of shape attributes and appearance attributes that are characteristic of the predetermined targets. As above, the strong classifier descriptor can be based on a subset of weak classifier descriptors that is selected from a plurality of weak classifier descriptors that each describe at least one of shape attributes and appearance attributes that are characteristic of parts of the predetermined targets, and wherein the subset of weak classifier descriptors includes at least one user-defined weak classifier descriptor that is defined by a user based on database images including the predetermined targets.

According to another aspect, there is provided a method of making a target detection device for detecting predetermined targets that are captured within an image, where the method includes generating a plurality of weak classifier descriptors that describes at least one of shape attributes and appearance attributes that are characteristic of parts of the predetermined targets, including generating at least one user-defined weak classifier descriptor that is defined by a user based on database images including the predetermined targets, determining the performance of the each of the plurality of weak classifier descriptors by analyzing the accuracy of each weak classifier descriptor in detecting the predetermined targets from a training image, and constructing a strong classifier descriptor from a subset of the plurality of weak classifier descriptors based on the performance of each weak classifier descriptor, wherein the subset includes at least one user-defined weak classifier descriptor.

BRIEF DESCRIPTION OF THE DRAWINGS

Exemplary embodiments are described in detail below with reference to the accompanying drawings in which.

DETAILED DESCRIPTION OF EMBODIMENTS

Exemplary embodiments of the broad principles outlined herein are described with reference to the various drawings.

Figure 1:
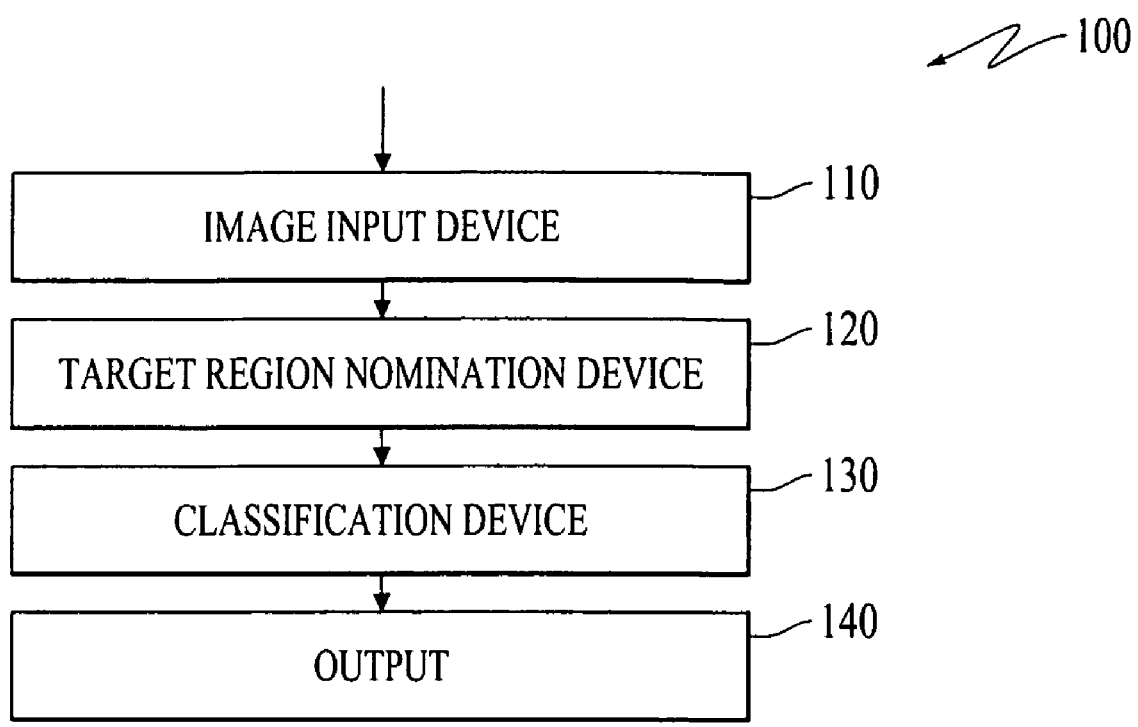
FIG. 1 is a detailed block diagram of an exemplary target detection device.

FIG. 1 shows a block diagram of an exemplary target detection device 100. The target detection device can include an image input device 110, a target region nomination device 120, and a classification device 130. During operation, the target detection device 100 receives an input, such as an image captured by a camera, and processes the image to detect any people or objects of a predetermined class that are captured within the image. The target detection device can be configured to detect predetermined targets that are present in an image such as people and/or objects of a certain type, for example, luggage, vehicles, packages, and the like.

The image input device 110 can receive an input image, such as video images or still photos, and transmit the image to the target region nomination device 120.

The target region nomination device 120 can analyze the inputted image to determine target regions of interest (ROIs) in the image that include targets having geometries that are consistent with the predetermined targets. For example, in person detection, the target region nomination device is configured to identify ROIs including targets with a nominal person width and height, where each ROI is geometrically consistent with the projection of a person. The target region nomination device can be configured to identify ROIs with an exhaustive approach, where all possible ROIs are considered. Alternatively, low level features such as motion cues based on background modeling or image differencing can be employed to select specific ROIs. The target region nomination device can transmit any ROIs to the classification device 130.

The classification device 130 can receive the identified ROIs from the target region nomination device and analyze the ROI to determine whether it corresponds to a true observation of a person or an object of the predetermined type. The classification device can analyze the ROI based on a strong classifier descriptor to determine whether the ROI includes any people or objects of the predetermined type. The strong classifier descriptor represents a description of shape and/or appearance attributes that are characteristic of the predetermined targets, such as people or objects of the predetermined class. The strong classifier descriptor, in turn, can be based on a combination of weak classifier descriptors $w_{c1}, w_{c2}, \ldots w_{cn}$, that describe shape and/or appearance attributes characteristic of parts of people or parts of objects of the predetermined class.

The classification device 130 can analyze the ROI with the strong classifier descriptor to determine whether the target in the ROI substantially corresponds to the strong classifier descriptor. That is, the classification device 130 can determine whether the shape and/or appearance attributes of the target are within a predetermined threshold of the strong classifier descriptor. Given all possible ROIs, the classification device can classify each ROI as having a predetermined target, or not.

Once the classification device determines whether the target in the ROI corresponds to a predetermined target, it can output the determination in output 140. The output 140 of the classification device 130 can include, for example, a visual tag on the image that identifies the target, or an alert to a user that indicates that a target has been detected in the image.

Figure 2:
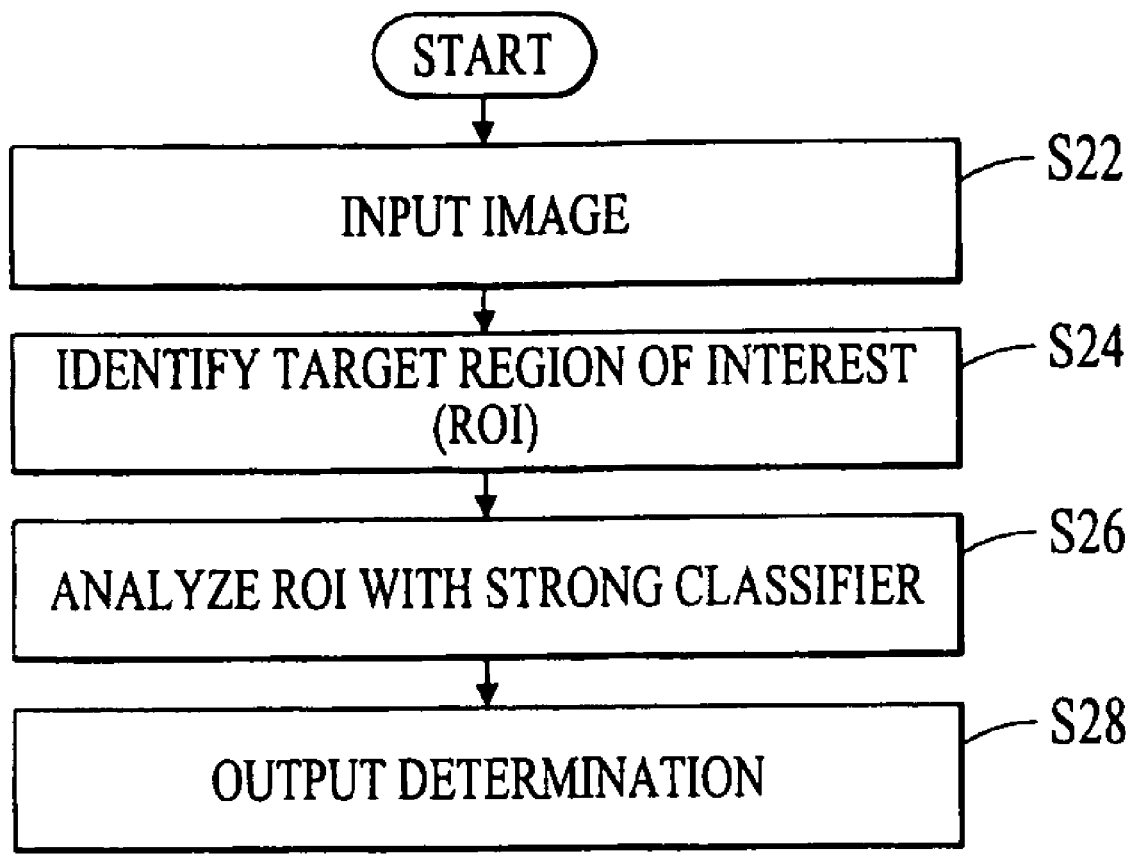
FIG. 2 is a flow chart illustrating an exemplary process for detecting targets.

An exemplary method of detecting predetermined targets using the target detection device 100 is illustrated in FIG. 2.

The method can begin and proceed to step S22 where an image is inputted from a an image source, such as a video camera. The process can proceed to step S24 where a target region of interest is identified in the inputted image. As above, the target region of interest can include a target with a geometry consistent with people or objects of the predetermined type. In step S26, the target region of interest is analyzed with a strong classifier to determine whether the target region of interest includes a true observation of the person or object of predetermined class. The determination of whether the region of interest includes a true observation of a person or object of the predetermined class can be output in step S28.

Figure 3:
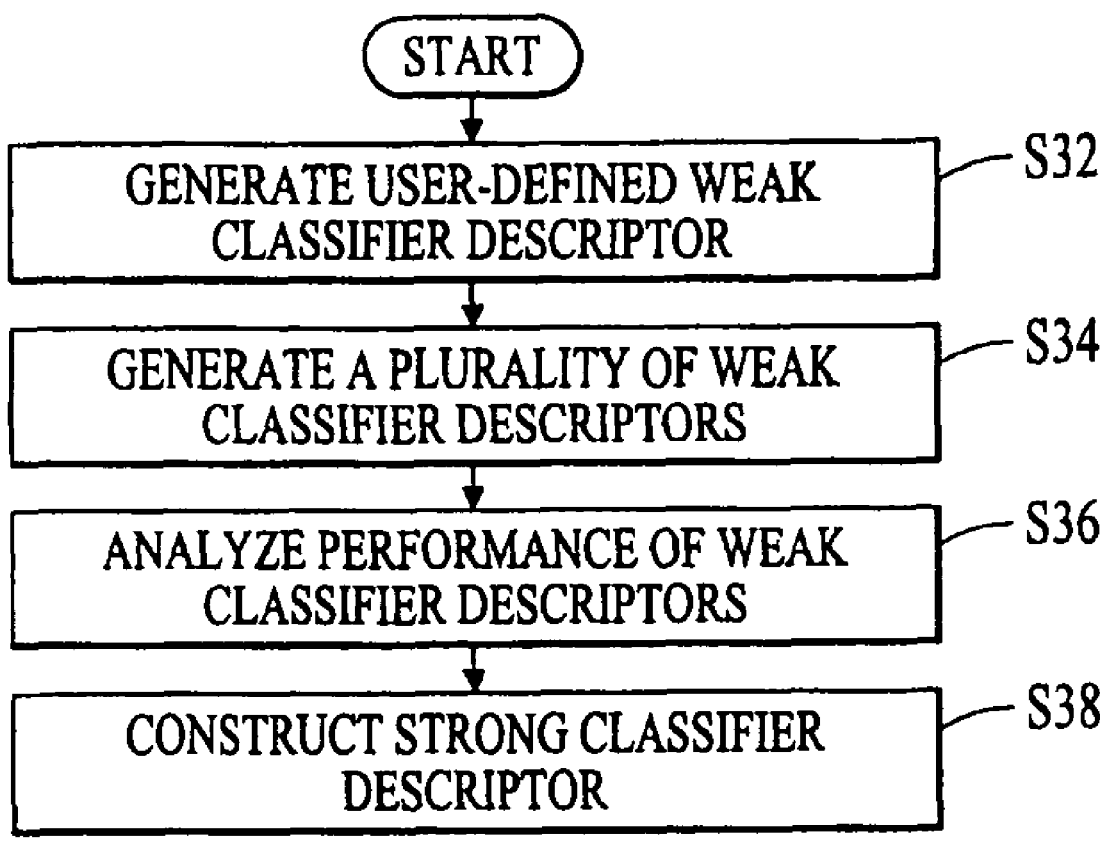
FIG. 3 is a flow chart illustrating an exemplary process for making a target detection device.

An exemplary process for constructing the target detection device 100 is illustrated in FIG. 3.

During operation of the process for constructing the target detection device, the process begins and proceeds to step S32 where a user-defined weak classifier descriptor is generated by a user from a database of images. The process can proceed to step S34 where a plurality of weak classifier descriptors can be generated. The plurality of weak classifier descriptors can include a plurality of user-defined weak classifier descriptors, such as those generated in step S32, or a combination of user-defined weak classifier descriptors and weak classifier descriptors that are not defined by a user.

In step S36, the performance of each of the plurality of weak classifier descriptors is tested on a training image to analyze the accuracy of each weak classifier descriptor in detecting the predetermined targets. In step S38, a strong classifier descriptor is constructed based on the performance of each weak classifier descriptor determined in step S36. The strong classifier descriptor can be output to the target detection device to be used in the classification device to determine whether a captured image includes a true observation of the predetermined targets.

The user defined weak classifier descriptors generated in step S32, are created by a user from a database image that captures a person or object of the predetermined class, and is designed to describe shape and/or appearance attributes that are characteristic of the predetermined targets. Generally, the user-defined classifiers can be defined based on contours or region differences of the images capturing the predetermined targets, such as contours or region differences of people or objects such as luggage, vehicles, and the like.

Figure 4:
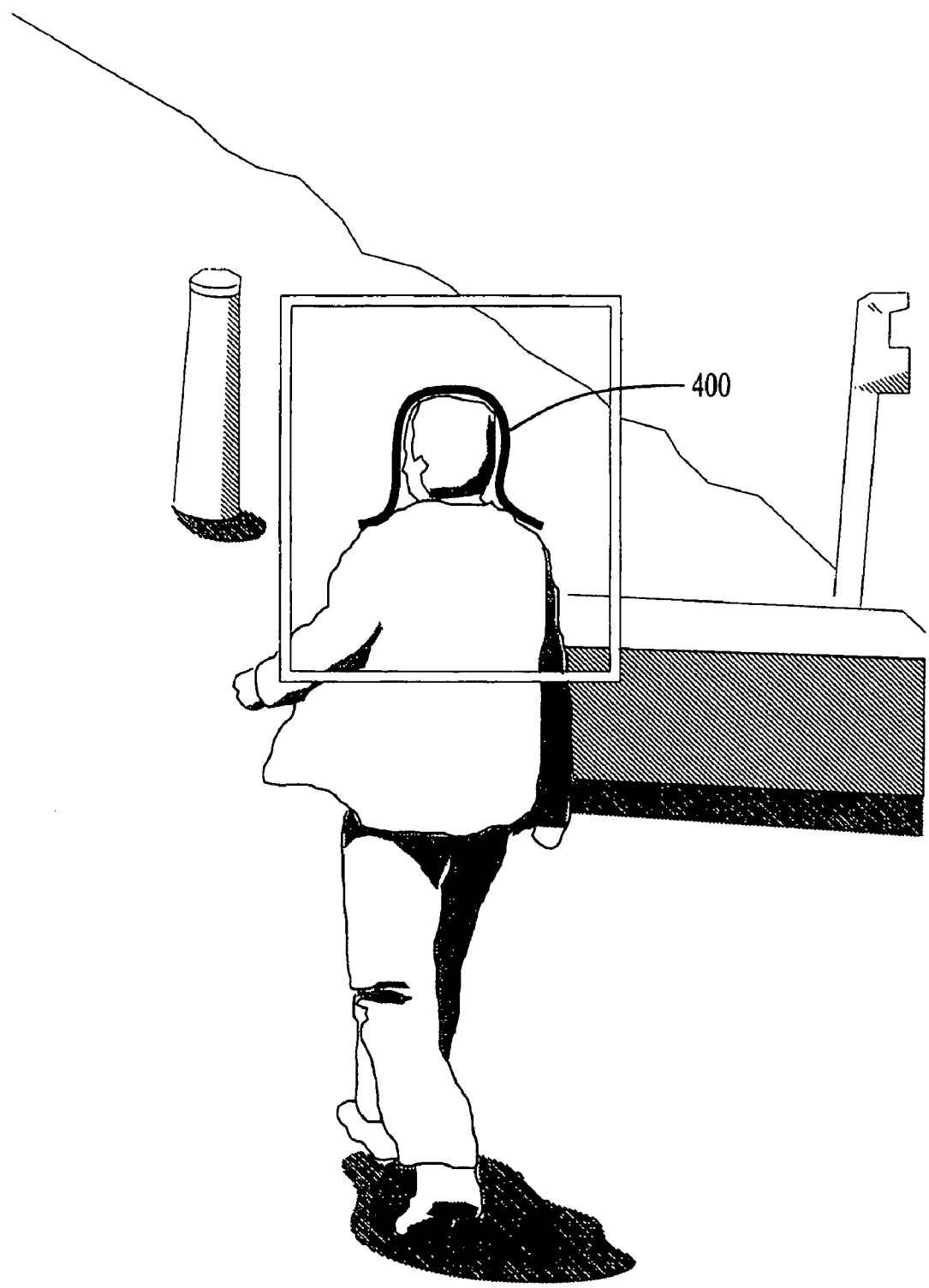
FIG. 4 illustrates an exemplary user defined weak classifier descriptor based on the contours of a person in an image.
Figure 5:
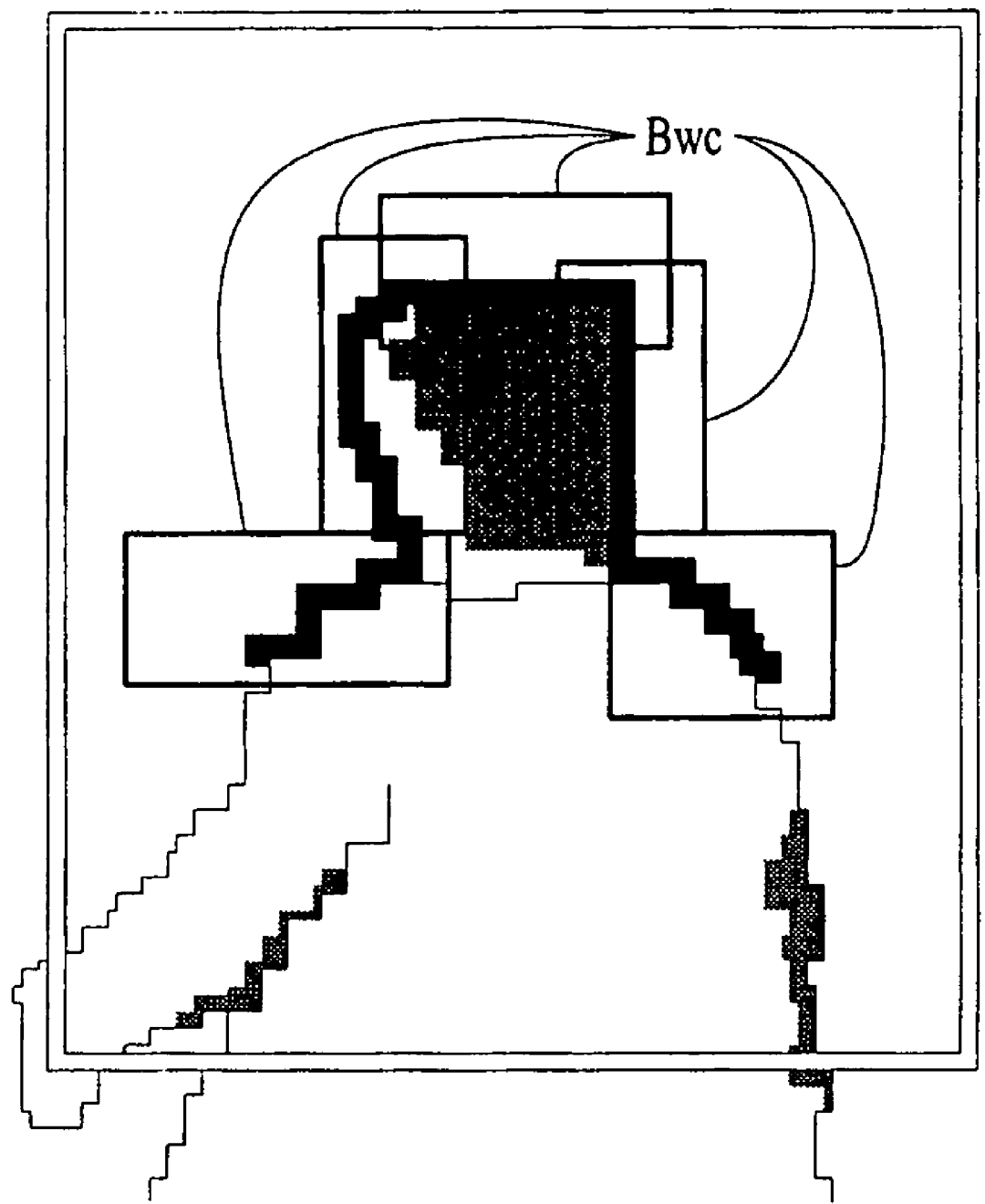
FIG. 5 illustrates boundary boxes of an exemplary contour based weak classifier descriptor.

The construction of an exemplary contour-based user-defined weak classifier descriptor for a person is illustrated in FIGS. 4 and 5. FIG. 4 illustrates a database image capturing a person and the associated ROI of the person. A user can define a contour 400 that is characteristic of a shape of a part of a person. In the embodiment illustrated in FIG. 4, contour 400 is characteristic of the shape of the shoulders and head region of a person. The contour 400 can be manually constructed by the user, for example, by drawing a line around the periphery of the parts of the person in the database image that a user believes may be characteristic of the shape of people. The contour 400 can be a set of manually defined line segments across important line boundaries. The contours can be defined in terms of a person or object centric coordinate system. Assuming a calibrated camera view, the coordinate system can be defined by identifying a specific target landmark. For example, for a person detector, the target landmark can be the top of the head or the center of the waistline.

After the user defines the contour 400, a set of boundary boxes Bwc (FIG. 5), including boundary boxes b, can be constructed, such that each point on the contour is contained by one of the boundary boxes and the minimum distance between each contour point on a boundary is less than a predetermined threshold. The unit normal vector $(n_v, n_h)$ for each contour point p can be calculated, where $n_v(p)$ and $n_h(p)$ are the vertical and horizontal components respectively. For each boundary box b, the vector S (Sobel operators) can be calculated with vertical and horizontal components:

$$\hat{S}_v(b) = \sum_{p \in (b)} n_v(p),$$

and, $$\hat{S}_h(b) = \sum_{p \in (b)} n_h(p).$$

The weak classifier can be used to determined whether or not the horizontal and vertical edge responses defined above are present in a given image.

Figure 6:
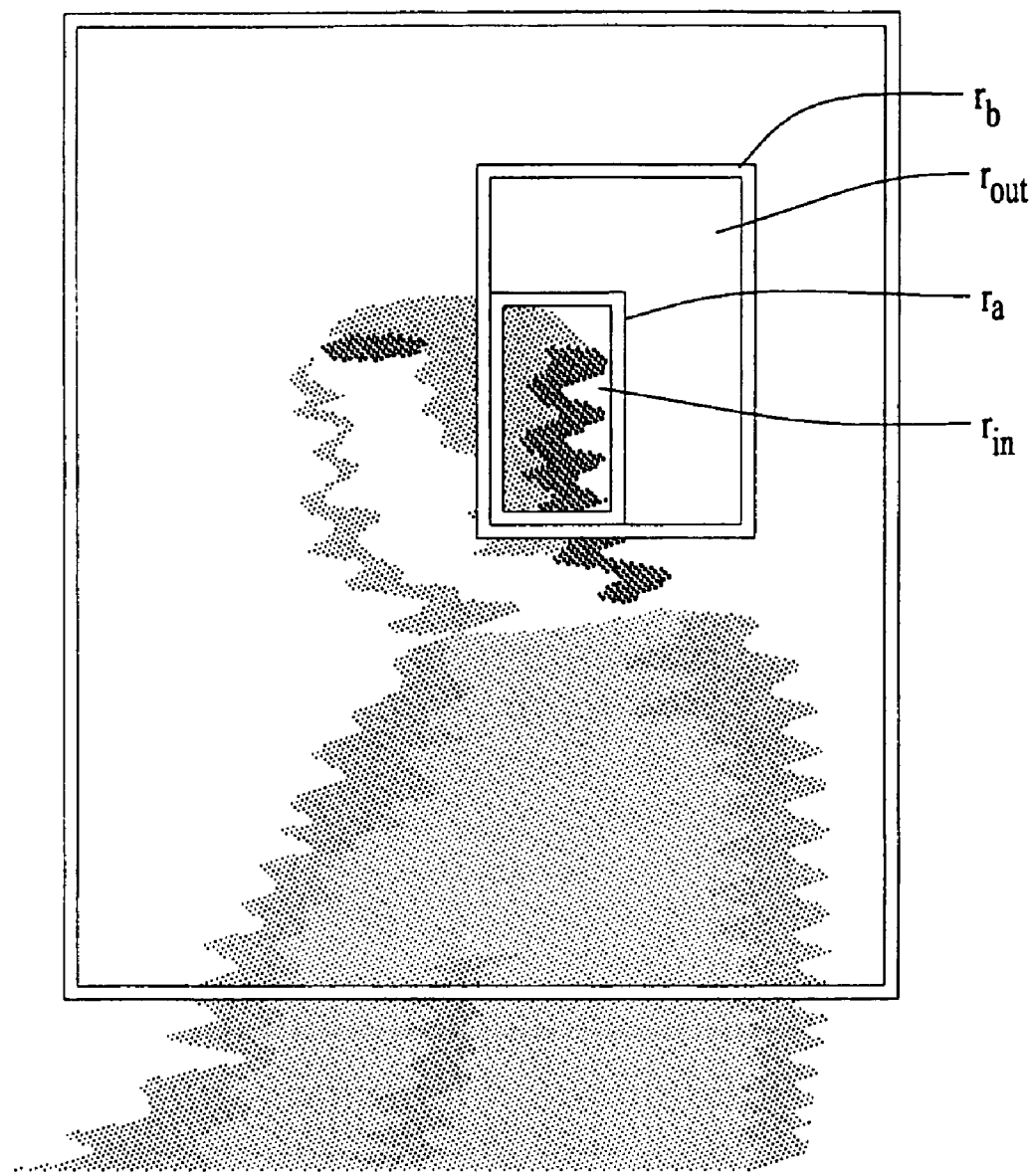
FIG. 6 is a diagram illustrating an exemplary user defined weak classifier descriptor based on region differences of a person in an image.

The construction of a region-based weak classifier is discussed with reference to FIG. 6 which illustrates a region-based weak classifier for a person. The region-based weak classifier can be used to describe an appearance attribute that is characteristic of a part of a person.

Given the image of the person and its associated ROI, the user can define two rectangles $r_a$ and $r_b$, which are used to define two regions $r_{in}$ and $r_{out}$. The inner region can be set to $r_a$. The outer region can be $r_b-r_a$. The weak classifier can be based on the difference between the pixel values contained in $r_{in}$ and $r_{out}$. If the outer region surrounds the inner region, then the weak classifier is able to detect blobs or regions with uniform intensity in the image. If $r_1$ and $r_2$ are adjacent rectangles then the weak classifier can be based on Haar-like wavelet response. A Haar wavelet is an image filter that emphasizes local edge information at different scales and orientations. The region based weak classifier can be used to determine whether or not this type of region response is present in an image.

As discussed above, in step S38 the strong classifier descriptor is constructed by determining the performance of the weak classifiers in detecting a person or object in a training image. Given a hypothetical training image X and a hypothesized person ROI, the following steps can be taken to evaluate the weak classifier: (1) the weak classifier ROI can be warped to match the hypothesized ROI and this warping can be applied to each of the rectangular structures of the weak classifiers; (2) the Sobel operator can be applied to the image X resulting in two new images, $X_v$, $X_h$ which correspond to the vertical and horizontal responses; and (3) integral images can be constructed for computational efficiency, for example, $I(X)$, $I(X^2)$, $I(X_v)$ and $I(X_h)$, where $X^2$ implies that the square of the intensity value is used.

The calculation of the response to the weak classifier is discussed below for the case of a contour-based weak classifier descriptor. For each boundary box $b \in B_{wc}$, the vector $S(b)$ with vertical and horizontal components:

$$S_v(b) = \sum_{x \in b} X_v(x)$$

and, $$S_h(b) = \sum_{x \in b} X_h(x)$$

is computed, where $X_v(x)$ and $X_h(x)$ are vertical and horizontal Sobel responses at pixel x. The calculation of S can be facilitated by the integral images $I(X_v)$ and $I(X_h)$. The weak classifer $w_c$ can be considered to produce a positive response if:

$$\sum_{b \in B_{we}} \frac{S \cdot \hat{S}}{|S||\hat{S}|} \geq \Theta_{wc}$$

and $$\sum_{b \in B_{we}} \frac{|S|}{b_w b_h} \geq \Omega_{wc},$$

where $\Theta_{w_c}$ and $\Omega_{w_c}$ are thresholds, $b_w$ is the width of $b_a$ and $b_h$ is the height of b. These terms can characterize relative edge strength and degree of correspondence between the training image edge information and the user-defined weak classifier.

For a region-based weak classifier, the weak classifier can be considered to generate a positive response if:

$$\frac{(\text{mean }(r_{in}) - \text{mean }(r_{out}))^2}{(1 + \text{var}(r_{in}))(1 + \text{var}(r_{out}))} \geq \Psi_{wc},$$

where $\Psi_{w_c}$ is a threshold, mean (r) is the mean intensity for region r and var(r) is the variance of the intensity values for region r. The mean and variance functions can be calculated using the integral images $I(X)$ and $I(X^2)$.

As discussed above, in step S38, the strong classifier descriptor can be constructed based on the performance of the weak classier descriptors in detecting people of objects in an image. The strong classifier can be a boosted classifier based on a plurality of the weak classifier descriptors. Specifically, once the user has defined the weak classifier descriptors that are the basis of the hypothesis space, a strong classifier can be constructed by optimizing the performance with respect to a training set. It should be understood that the number of weak classifier descriptors defining the hypothesis space is not particularly limited.

The strong classifier can be constructed based on a labeled training set with N samples. Each sample in the training set can be composed of an image, a rectangular ROI and a label. The label is set to "1" if the sample corresponds to a true person observation, and is otherwise set to "−1". A weak classifier descriptor takes as input a sample which is then classified based on the image response to the weak classifier descriptor, as described above. If the sample was classified as a person then a positive "1" is generated and if the sample was not classified as a person then the weak classifier descriptor responds negatively "−1". Generally, no single weak classifier descriptor is capable of achieving a high degree of accuracy in target detection. However, an accurate strong classifier can be constructed based on a linear combination of weak classifiers.

In step S38, a boosting algorithm can automatically determine the optimal mechanism for combining the weak classifier descriptors to form the strong classifier descriptors. For example, the strong classifier descriptors can be constructed iteratively from the weak classifiers by using the Adaboost algorithm. The Adaboost algorithm is described below.

During each iteration of the Adaboost process, a probability p can be assigned to each sample and the weak classifier descriptor from the hypothesis space with the lowest expected error is selected, where $s_i$ is the ith sample, $l_i$ is it label and $p_i$ is its assigned probability. Initially, the pdf associated with the training data can be uniformly distributed. After each iteration, the pdf is modified so as to emphasize samples that were misclassified in the previous iteration. The resulting strong classifier descriptor can be composed of a linear combination of the selected weak classifiers. This is accomplished by iteratively selecting the weak classifier that minimizes E:

$$E(wc) = \sum_{i}^{N} \frac{(1 - wc(s_i) * l_i)p_i}{2},$$

The values of $\Theta_{w_c}$ and $\Omega_{w_c}$ (for contour based classifiers) or $\Psi_{w_c}$ (for region based classifiers), can be computed at each Adaboost iteration such that the expected error in the above equation is minimized.

The strong classifier descriptor can also be constructed from the plurality of weak classifier descriptors based on site-specific training. For example, the initial training set can be generic and meant to capture a wide range of viewing conditions, and once an initial detector is constructed, the detector can be adapted to the view of a specific camera. This can be accomplished by collecting a number of representative images from the camera view that do not contain any people or objects of the predetermined type. The images can be processed by the initial version of the detector, and any positive detection (which will be false) are identified. The training data can then be augmented with the negative samples to compute the new detector. This process can be repeated until no new false detections are generated. Thus, the detector can be trained to the specific site. Similarly, the detector can be adapted to specific conditions using condition-specific training. For example, the strong classifier descriptor can be adapted based a training set of images in specific environmental conditions, such as rainy conditions, and then used when rain is detected.

The detector can be used to continually scan an image feed, in particular a video feed, for humans or other objects without relying on a stable background. This is particularly useful for dynamic scenes with crowds and traffic, and may also be useful with mobile cameras such as PTZ units and vehicle mounted cameras.

The detector can also be used to track people or objects over a multi-camera network. The tracker can follow a detect and track paradigm where the process of person detection and tracking are kept separate. Site-adaptive detection can be performed on edge devices. Edge devices can be actual sensors such as cameras with embedded processing capabilities. Using this paradigm, a camera does not necessarily need to transmit imagery to a central server. Each edge device can process one or more multiple camera views depending on computation resources and frame rate requirements. At every step, detections can be projected into the ground plane and supplied to a centralized tracker that sequentially processes the locations of these detections from all available camera views. Tracking of extended targets in the imagery is hence reduced to tracking 2D point locations in the ground plane, which can be performed very efficiently. The central tracker may operate on a physically separate processing node, connected to the processing units that perform detection via a network connection. It can receive detections out of order from the different camera views due to network delays. Detections can be time stamped according to a synchronous clock, buffered and time re-ordered by the central tracker before processing. Tracking can be performed by a JPDAF algorithm that has good performance characteristics in cluttered environments. The JPDAF algorithm improves previous approaches that were based on the general nears neighbor based assignment strategies. The described tracking approach is computationally very efficient, and hence suited for tracking a large number of targets in many camera views simultaneously. MHT or Bayesian multi-target trackers can also be employed. These algorithms can avoid making hard decisions based solely on information gained at each iteration. By delaying such decisions, more robustness with respect to missed detections and false assignments can be achieved, but generally at the cost of greater computational requirements.

In one example application of the general principles and techniques described above, a site specific person detector was generated. A projective matrix was determined for a specific camera view and a user specified the region of the ground plane for which detections should be considered. A set of potential person ROIs were generated for the site. The sampling of the potential ROI set is dependent on the width of the bounding boxes. The total number of potential ROIs for the site considered was 908. A detector was generated using 30 generic positive samples and 30 negative samples taken from the site. The user manually defined 102 weak classifier descriptors and 3 sample images were used for suppressing site-specific false positives. After 3 iterations of suppression, a strong detector was constructed with fifteen weak classifier descriptors. The detector was able to process 10 frames per second on a standard laptop computer.

While the disclosed methods and systems have been described in conjunction with exemplary embodiments, these embodiments should be viewed as illustrative, not limiting. It should be understood that various modifications, substitutes, or the like are possible within the spirit and scope of the disclosed devices, methods and systems.

What is claimed is:

1. A target detection device for detecting predetermined targets that are captured within an image, the device including:
   a target region identification device that is configured to identify a region of interest in the captured image, the region of interest including a target having geometries consistent with the predetermined targets; and
   a classification device that is configured to determine whether the region of interest includes the predetermined targets by analyzing the region of interest with a strong classifier descriptor that describes at least one of shape attributes and appearance attributes that are characteristic of the predetermined targets,
   wherein the strong classifier descriptor is based on a linear weighted combination of a subset of weak classifier descriptors, and the subset of weak classifier descriptors is selected from a plurality of weak classifier descriptors that each describe at least one of shape attributes and appearance attributes that are characteristic of parts of the predetermined targets, and wherein the subset of weak classifier descriptors includes at least one user-defined weak classifier descriptor that is defined by a user based on database images including the predetermined targets.

2. The target detection device according to claim 1, further including an image input device that is configured to input an image.

3. The target detection device according to claim 1, wherein the predetermined targets are at least one of people and objects.

4. The target detection device according to claim 1, wherein the subset of weak classifier descriptors is selected from the plurality of weak classifier descriptors by iteratively selecting the subset of weak classifier descriptors that exhibits improved performance in detecting the predetermined targets.

5. The target detection device according to claim 4, wherein, the subset of weak classifier descriptors is selected from the plurality of weak classifier descriptors by determining the subset of weak classifier descriptors that exhibits the lowest error rate in detecting the predetermined targets.

6. The target detection device according to claim 4, wherein the subset of weak classifier descriptors is selected from the plurality of weak classifier descriptors by iteratively selecting the subset of weak classifier descriptors using an Adaboost algorithm.

7. The target detection device according to claim 1, wherein the strong classifier descriptor is adapted to a camera site by iteratively selecting the subset of weak classifier descriptors that exhibits improved performance in detecting the predetermined targets from training images taken from the camera site.

8. A target detection device for detecting predetermined targets that are captured within an image, the device including:
- a target region identification device that is configured to identify a region of interest in the captured image, the region of interest including a target having geometries consistent with the predetermined targets; and
- a classification device that is configured to determine whether the region of interest includes the predetermined targets by analyzing the region of interest with a strong classifier descriptor that describes at least one of shape attributes and appearance attributes that are characteristic of the predetermined targets,
- wherein the strong classifier descriptor is based on a subset of weak classifier descriptors that is selected from a plurality of weak classifier descriptors that each describe at least one of shape attributes and appearance attributes that are characteristic of parts of the predetermined targets, and wherein the subset of weak classifier descriptors includes at least one user-defined weak classifier descriptor that is defined by a user based on database images including the predetermined targets, and
- wherein the strong classifier descriptor is adapted to an environmental condition by iteratively selecting the subset of weak classifier descriptors that exhibits improved performance in detecting the predetermined targets from training images taken with the environmental condition.

9. The target detection device according to claim 1, wherein the at least one user-defined weak classifier descriptor is defined from contours of parts of the predetermined targets in the database image.

10. The target detection device according to claim 9, wherein the classification device is configured to determine whether the region of interest includes a vertical response and a horizontal response that are within a predetermined threshold of the contours from the user-defined weak classifier descriptor.

11. The target detection device according to claim 1, wherein the at least one user-defined weak classifier descriptor is defined based on region differences of the predetermined targets in the database image.

12. The target detection device according to claim 11, wherein the user-defined weak classifier is defined as a difference in image intensity values between regions of the predetermined targets, and wherein the classification device is configured to determine whether the region of interest includes a first region and a second region having a difference in intensity values that are within a predetermined threshold of the user-defined weak classifier descriptor.

13. A tracking system for tracking detected targets over a multi-camera network, including the target detection device according to claim 1, and a plurality of cameras.

14. A method of detecting predetermined targets that are captured within an image, the method including:
- identifying a target region of interest in the captured image, the target region of interest including a target with geometries consistent with the predetermined targets; and
- determining whether the region of interest includes the predetermined targets by analyzing the region of interest with a strong classifier descriptor that describes at least one of shape attributes and appearance attributes that are characteristic of the predetermined targets;
- wherein the strong classifier descriptor is based on a linear weighted combination of a subset of weak classifier descriptors, and the subset of weak classifier descriptors is selected from a plurality of weak classifier descriptors that each describe at least one of shape attributes and appearance attributes that are characteristic of parts of the predetermined targets, and wherein the subset of weak classifier descriptors includes at least one user-defined weak classifier descriptor that is defined by a user based on database images including the predetermined targets.

15. The method according to claim 14, wherein the subset of weak classifier descriptors is selected from the plurality of weak classifier descriptors by iteratively selecting the subset of weak classifier descriptors that exhibits improved performance in detecting the predetermined targets.

16. The method according to claim 14, wherein, the subset of weak classifier descriptors is selected from the plurality of weak classifier descriptors by determining the subset of weak classifier descriptors that exhibits the lowest error rate in detecting the predetermined targets.

17. The method according to claim 14, wherein the subset of weak classifier descriptors is selected from the plurality of weak classifier descriptors by iteratively selecting the subset of weak classifier descriptors using an Adaboost algorithm.

* * * * *